United States Patent
Huang et al.

(10) Patent No.: US 7,380,627 B2
(45) Date of Patent: Jun. 3, 2008

(54) REMOTE CONTROL VEHICLE WITH UV STERILIZER

(75) Inventors: Chih-Hong Huang, Taipei (TW); Shou-Cheng Liao, Taipei (TW)

(73) Assignee: National Taipei University Technology, Taipei (TW)

( * ) Notice: Subject to any disclaimer, the term of this patent is extended or adjusted under 35 U.S.C. 154(b) by 521 days.

(21) Appl. No.: 11/178,332

(22) Filed: Jul. 12, 2005

(65) Prior Publication Data
US 2006/0011397 A1   Jan. 19, 2006

(30) Foreign Application Priority Data
Jul. 15, 2004   (TW)   ............... 93211155 U

(51) Int. Cl.
*B60R 27/00*   (2006.01)
(52) U.S. Cl. .................................. 180/167; 901/1
(58) Field of Classification Search ................ 180/167, 180/169; 422/24; 901/1
See application file for complete search history.

(56) References Cited
U.S. PATENT DOCUMENTS

| | | | | |
|---|---|---|---|---|
| 4,932,831 A | * | 6/1990 | White et al. ................ 414/732 |
| 5,148,091 A | * | 9/1992 | Lagercrantz ............ 318/568.11 |
| 5,350,033 A | * | 9/1994 | Kraft ............................ 180/167 |
| 5,570,992 A | * | 11/1996 | Lemelson ................. 414/744.3 |
| 5,974,347 A | * | 10/1999 | Nelson ......................... 701/22 |
| 6,405,798 B1 | * | 6/2002 | Barrett et al. ........... 166/250.01 |
| 6,534,770 B2 | * | 3/2003 | Miller et al. ............ 250/363.02 |
| 6,656,424 B1 | * | 12/2003 | Deal ............................. 422/3 |
| 6,701,772 B2 | * | 3/2004 | Kreichauf et al. ............ 73/23.2 |

* cited by examiner

*Primary Examiner*—Christopher Bottorff

(57) ABSTRACT

A remote control vehicle includes a cart, an ultraviolet radiation tube and a remote control device. The cart has a video device, a control signal antenna and a video signal antenna. The control signal antenna and the video signal antenna are disposed by the video device. The remote control device is used to send out control signals to the control signal antenna so as to control the motions of the cart. In use, users place the cart in an air conduit of an air conditioning system and steer it with the remote control device so that the cart may reach every part in the air conduit. Also, the ultraviolet radiation tube is activated to kill all the bacteria and microorganisms in the air conduits. Such that, the users will not be exposed to the ultraviolet radiation emitted by the tube, and hence the safety of use is assured.

7 Claims, 3 Drawing Sheets

REMOTE CONTROL VEHICLE WITH UV STERILIZER

BACKGROUND OF THE INVENTION

1. Field of the Invention

The invention generally relates to a remote control vehicle with UV sterilizer. More particularly, the invention relates to a remotely controlled ultraviolet radiation disinfecting cart which may be used in the air conduits of offices, labs, wards, factories, etc. to disinfect and which may move freely in such air conduits.

2. Description of the Related Art

Generally speaking, bacteria and microorganisms would grow in the air conduits of an air conditioning system after a period of use. Hence, these bacteria and microorganisms may flow out of the conduits and endanger the health of the relevant people and negatively affect the quality of the product therein.

Conventionally, a mobile structure with a vacuum cleaner was utilized so as to carry out vacuum cleaning in the air conduits; though it may reach every part of a conduit, it can not eliminate the bacteria in the conduits. Therefore, an ultraviolet radiation lamp was developed; however, such lamp was disposed at a fixed location within a conduit and hence its ultraviolet radiation can not reach every part of a conduit and other conduits.

Whence, the traditional devices have disadvantages and need to be improved.

To eliminate the disadvantages, the inventor has put in many years of effort in the subject and has come up with the remotely controlled ultraviolet radiation disinfecting cart of the present invention.

SUMMARY OF THE INVENTION

The present invention is to provide such a remotely controlled cart with an ultraviolet radiation tube. Such cart may be used to move around in air conduits and hard-to-reach places to disinfect and kill the bacteria and microorganisms contained therein so as to enhance the health of the relevant people.

Another, the present invention is to provide a remotely controlled ultraviolet radiation disinfecting cart that may be used to carry out disinfecting in air conduits of offices, labs, wards, factories, etc. so as to enhance the health of the relevant people and the quality of the product therein.

Still, the present invention is to provide a remotely controlled ultraviolet radiation disinfecting cart which allows a user not be exposed to the ultraviolet radiation emitted by the tube. Hence, the safety in use is assured.

Still another, the present invention is to provide a remotely controlled ultraviolet radiation disinfecting cart that is structurally simple, easy to operate and with a low manufacturing cost.

To reach the objects, the remote control vehicle with ultraviolet sterilizer of the present invention mainly comprises a cart, a video device, a power-supply unit, an ultraviolet radiation tube and a remote control device. The video device is disposed on the front portion of the cart. A control signal antenna and a video signal antenna are disposed by the video device. A power-supply unit is arranged behind the video device. The power-supply unit can provide all the power needed for the operations of all the devices and components of the cart. An upright support is disposed on the front side of the power-supply unit. A shorter upright support is arranged on the rear side of the power-supply unit. One end of the ultraviolet radiation tube is connected with the shorter upright support; the other end of the ultraviolet radiation tube is connected with the upright support. The remote control device may be used to send out control signals to the control signal antenna of the cart so as to control the motions of the cart. In addition, a monitor is provided on the remote control device so as to clearly display the video signals sent out from the video signal antenna. In use, a user may place the cart in an air conduit of an air conditioning system and may steer it with the remote control device so that the cart may reach each part in the air conduit. Also, the ultraviolet radiation tube may be activated to kill all the bacteria and microorganisms contained in the air conduit. In addition, the user is not exposed to the ultraviolet radiation emitted by the tube and hence the safety in use is assured.

These features and advantages of the present invention will be fully understood and appreciated from the following detailed description of the accompanying drawings.

DETAILED DESCRIPTION OF THE PREFERRED EMBODIMENT

Figure 1:
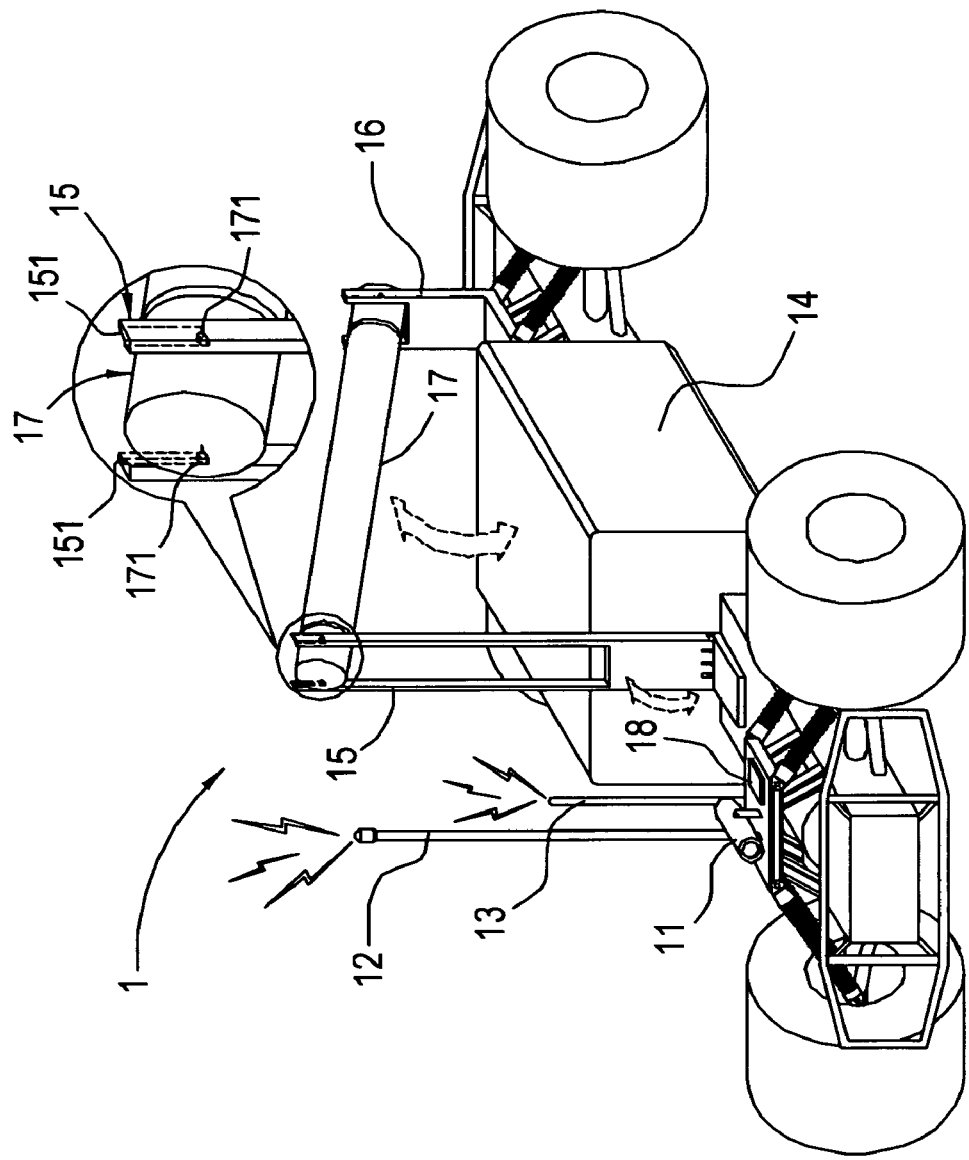
FIG. 1 is a perspective view of the remotely controlled ultraviolet radiation disinfecting cart of the present invention.
Figure 1:
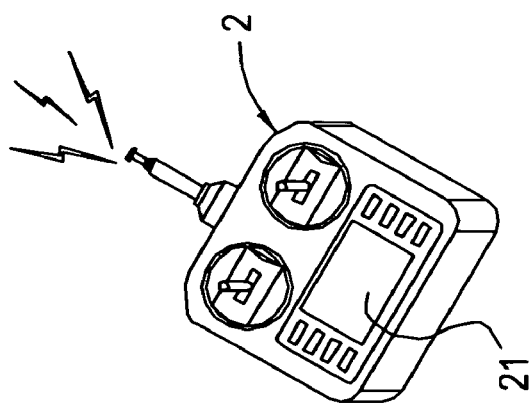
Figure 2:
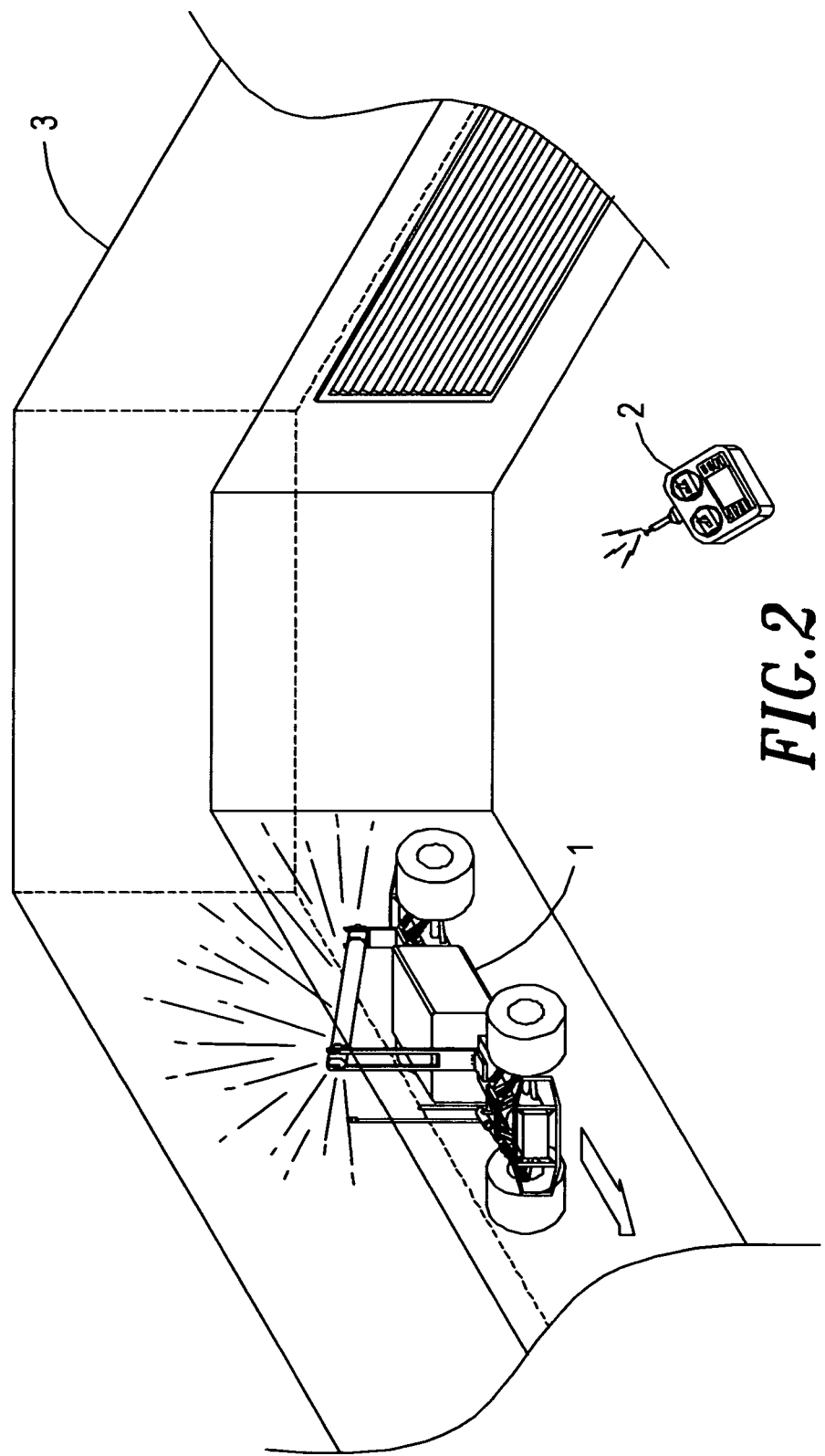
FIG. 2 is a diagram schematically illustrating how the remotely controlled ultraviolet radiation disinfecting cart of the present invention is used in a conduit.

Referring to FIGS. 1 and 2, the remotely controlled ultraviolet radiation disinfecting cart of the present invention comprises a cart 1 and a remote control device 2.

The cart 1 has a video device 11, a control signal antenna 12 and a video signal antenna 13. The video device 11 is disposed on the front portion of the cart 1. The control signal antenna 12 and the video signal antenna 13 are disposed by the video device 11. A power-supply unit 14 is arranged behind the video device 11. An upright support 15 is disposed on the front side of the power-supply unit 14. Two grooves 151 are provided on the upper portion of the upright support 15. A shorter upright support 16 is arranged on the rear side of the power-supply unit 14. One end of an ultraviolet radiation tube 17 is connected with the shorter upright support 16; the other end of the ultraviolet radiation tube 17 is connected with the upright support 15 through the engagement between the two grooves 151 and two protrusions 171 provided on the ultraviolet radiation tube 17. A chip 18 is disposed at an appropriate location on the cart 1. The video device 11 may be a video camera or other type of video device. The control signal antenna 12 may be used to receive the remote control signals so as to control the motions of the cart 1. The video signal antenna 13 may be used to send out the video signals of the video device 11 to the remote control device 2. The power-supply unit 14 can provide all the power needed for the operations of all the devices and components of the cart 1. The power-supply unit 14 is a rechargeable battery. The chip 18 includes motion commands so that a user may control the motions of the cart 1.

The remote control device 2 may be used to send out control signals to the control signal antenna 12 of the cart 1 so as to control the motions of the cart 1. In addition, a monitor 21 is provided on the remote control device 2 so as to clearly display the video signals sent out from the video signal antenna 13.

In use, a user may place the cart 1 in an air conduit 3 of an air conditioning system, as illustrated in FIG. 2. The user may steer it with the remote control device 2 so that the cart 1 may reach each part in the air conduit 3. Also, the ultraviolet radiation tube 17 may be activated to kill all the bacteria and microorganisms in the air conduit 3. In addition, the user is not exposed to the ultraviolet radiation emitted by the tube 17, and hence the safety in use is assured.

Figure 3A:
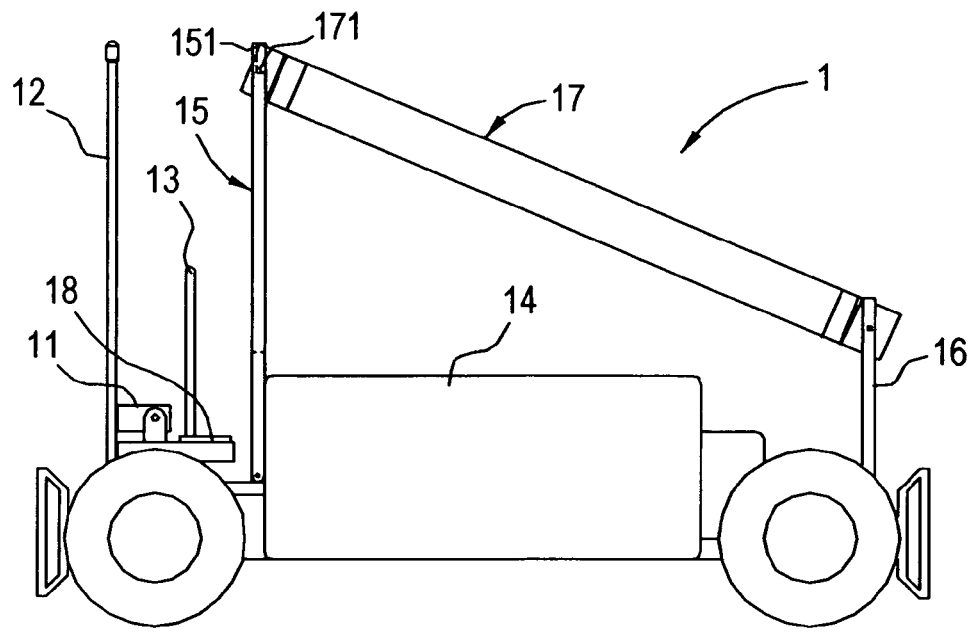
FIGS. 3A and 3B are two side views of the remotely controlled ultraviolet radiation disinfecting cart of the present invention, showing how the ultraviolet radiation tube is retracted into a horizontal position.
Figure 3B:
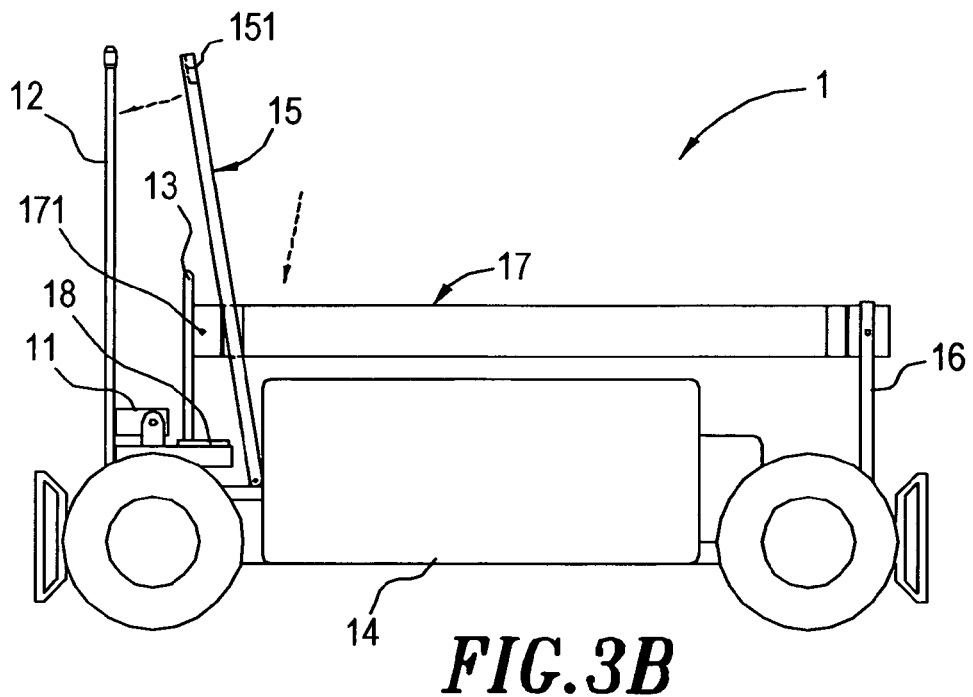

Referring to FIGS. 3A and 3B, when the cart 1 is not in use, a user may move the upright support 15 forwards to allow the two protrusions 171 of to the ultraviolet radiation tube 17 to disengage with the two grooves 151 of the upright support 15 so that the ultraviolet radiation tube 17 may be retracted into a horizontal position, which makes it easier for the cart 1 to be stored away.

In contrast to a cart of the prior art, the remotely controlled ultraviolet radiation disinfecting cart of the present invention has the following advantages:

1. The remotely controlled cart, with an ultraviolet radiation tube, may be used to move around in air conduits and hard-to-reach places to disinfect and kill the bacteria and microorganisms contained thereof so as to enhance the health of the relevant people.

2. The cart may be used to disinfect in air conduits of offices, labs, wards, factories, etc. so as to enhance the health of the relevant people and the quality of the product therein.

3. A user will not be exposed to the ultraviolet radiation emitted by the tube. Hence, the safety in use is enhanced.

4. The remotely controlled ultraviolet radiation disinfecting cart of the present invention is structurally simple, easy to operate and with a low manufacturing cost.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A remote control vehicle with ultraviolet sterilizer, comprising:
   a cart;
   a video device, disposed on the front portion of the cart;
   a control signal antenna and a video signal antenna, disposed by the video device;
   a power-supply unit, arranged behind the video device;
   an upright support, disposed on the front side of the power-supply unit;
   two grooves, provided on the upper portion of the upright support;
   a shorter upright support, arranged on the rear side of the power-supply unit;
   an ultraviolet radiation tube, one end of which is connected with the shorter upright support and the other end is connected with the upright support through the engagement between the two grooves and two protrusions provided on the ultraviolet radiation tube;
   a chip, disposed at a predetermined location on the cart;
   a remote control device, which is used to send out control signals to the control signal antenna of the cart so as to control the motions of the cart; and
   a video monitor, provided on the remote control device so as to clearly display video signals sent out from the video signal antenna.

2. The vehicle as in claim 1, wherein the video device is a video camera.

3. The vehicle as in claim 1, wherein the control signal antenna is used to receive remote control signals so as to control motions of the cart.

4. The vehicle as in claim 1, wherein the video signal antenna is used to send out video signals of the video device to the remote control device.

5. The vehicle as in claim 1, wherein the power-supply unit is used to provide power for the operations of the vehicle.

6. The vehicle as in claim 5, wherein the power-supply unit is a rechargeable battery.

7. The vehicle as in claim 1, wherein the chip includes motion commands so that a user can control the motions of the cart.

* * * * *